US009300564B2

(12) United States Patent
Previdi et al.

(10) Patent No.: US 9,300,564 B2
(45) Date of Patent: Mar. 29, 2016

(54) ORDERED FLOODING REQUESTS FOR PATH COMPUTATION ELEMENTS

(75) Inventors: Stefano Previdi, Rome (IT); Jean-Philippe Vasseur, Saint Martin d'Uriage (FR); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 13/524,057

(22) Filed: Jun. 15, 2012

(65) Prior Publication Data
US 2013/0336109 A1  Dec. 19, 2013

(51) Int. Cl.
*H04L 12/26* (2006.01)
*H04L 12/24* (2006.01)
*H04L 12/751* (2013.01)
*H04L 12/703* (2013.01)
*H04L 12/717* (2013.01)
*H04L 12/723* (2013.01)

(52) U.S. Cl.
CPC ............... *H04L 43/16* (2013.01); *H04L 41/12* (2013.01); *H04L 45/025* (2013.01); *H04L 45/28* (2013.01); *H04L 45/42* (2013.01); *H04L 45/50* (2013.01)

(58) Field of Classification Search
CPC ............ H04L 12/2602; H04L 12/5693; H04L 12/2697; H04L 29/06; H04L 29/14; H04L 29/08072; H04L 29/08144; H04L 29/08171; H04L 29/12009; H04L 41/12; H04L 43/00; H04L 43/50; H04L 45/00; H04L 45/02; H04L 45/04; H04L 45/12; H04L 45/22; H04L 45/28; H04L 45/123; H04L 45/124; H04L 47/10; H04L 47/11; H04L 47/12; H04L 47/30; H04L 47/32; H04L 47/2441; H04J 3/14; H04Q 11/0478; H04W 84/06; H04W 84/18
USPC .......... 370/216, 217, 229, 235, 237, 238, 241, 370/255, 310, 389, 400, 254, 351; 709/203, 709/238–242; 455/428
See application file for complete search history.

(56) References Cited

U.S. PATENT DOCUMENTS 6,535,498 B1 * 3/2003 Larsson et al. ................. 370/338
7,031,262 B2    4/2006 Vasseur et al.
7,123,587 B1 * 10/2006 Hass et al. ..................... 370/238

(Continued)

FOREIGN PATENT DOCUMENTS

WO    WO 02082720 A2 * 10/2002

OTHER PUBLICATIONS

Crabbe, et al., "PCEP Extensions for Stateful PCE", IETF Trust, Network Working Group, Internet Draft, draft-ietf-pce-stateful-pce-00, Feb. 2012, 52 pages.

(Continued)

*Primary Examiner* — Alpus H Hsu
*Assistant Examiner* — Dharmesh Patel
(74) *Attorney, Agent, or Firm* — Parker Ibrahim & Berg LLC; James M. Behmke; Stephen D. LeBarron

(57) ABSTRACT

In one embodiment, a stateful path computation element (PCE) in a computer network determines a need to route at least a threshold number of tunnels, and in response, triggers a routing update from a determined set of routers. Having updated the routing information and available network resources for the set of routers, the stateful PCE may then compute the tunnels based on the update.

18 Claims, 11 Drawing Sheets

(56) References Cited

U.S. PATENT DOCUMENTS

| | | |
|---|---|---|
| 7,551,569 B2 | 6/2009 | Vasseur |
| 7,558,214 B2 | 7/2009 | Previdi et al. |
| 7,660,254 B2 | 2/2010 | Vasseur et al. |
| 7,668,971 B2 | 2/2010 | Vasseur et al. |
| 7,684,351 B2 | 3/2010 | Vasseur et al. |
| 7,801,137 B2 | 9/2010 | Vasseur et al. |
| 7,886,079 B2 | 2/2011 | Vasseur et al. |
| 7,986,618 B2 | 7/2011 | Charny et al. |
| 7,995,500 B2 | 8/2011 | Vasseur |
| 8,199,642 B2 | 6/2012 | Vasseur et al. |
| 8,363,571 B2 | 1/2013 | Vasseur et al. |
| 8,369,213 B2 | 2/2013 | Vasseur et al. |
| 2005/0276251 A1 | 12/2005 | Biddiscombe et al. |
| 2006/0140111 A1 | 6/2006 | Vasseur et al. |
| 2006/0182115 A1* | 8/2006 | Shah et al. ............... 370/395.4 |
| 2008/0047011 A1* | 2/2008 | Asati et al. ............... 726/23 |
| 2008/0198755 A1* | 8/2008 | Vasseur et al. ............ 370/248 |
| 2010/0061366 A1* | 3/2010 | DelRegno et al. ......... 370/389 |
| 2010/0214913 A1* | 8/2010 | Kompella ................. 370/230 |

OTHER PUBLICATIONS

Farrel, et al., "A Path Computation Element (PCE)-Based Architecture", The Internet Society, Network Working Group, Request for Comments 4655, Aug. 2006, 41 pages.

Ginsberg, et al., "Advertising Generic Information in IS-IS", IETF Trust, Network Working Group, Internet Draft, draft-ietf-isis-genapp-04.txt, Nov. 2010, 13 pages.

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

Chamania, et al., "An Adaptive Inter-Domain PCE Framework to Improve Resource Utilization and Reduce Inter-Domain Signaling", Optical Switching and Networking, vol. 6, Issue 4, Dec. 2009, pp. 259-267, Elsevier Science Publishers, Amsterdam, The Netherlands.

Cipolla, et al., "Notification of Transmittal of the International Search Report and the Written Opinion of the International Searching Authority, or the Declaration", Patent Cooperation Treaty, International Application No. PCT/US2013/045945, mailed Nov. 7, 2013, 11 pages, European Patent Office, Rijswijk, Netherlands.

Liu, et al., "Fast Topology Convergence for Hierarchical Routing in Automatically Switched Optical Network (ASON)", Network Architectures, Management, and Applications, Proceedings of the SPIE, vol. 5282, Apr. 2004, pp. 332-342, Bellingham, WA.

Zhang, et al., "Applicability of Stateful Path Computation Element (PCE)", Network Working Group, Internet Draft, draft-zhang-pce-stateful-pce-app-00, Mar. 5, 2012, 20 pages, the Internet Engineering Task Force, Geneva, Switzerland.

* cited by examiner

ORDERED FLOODING REQUESTS FOR PATH COMPUTATION ELEMENTS

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE"<draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a stateful path computation element (PCE) in a computer network determines a need to route at least a threshold number of tunnels, and in response, triggers a routing update from a determined set of routers. Having updated the routing information and available network resources for the set of routers, the stateful PCE may then compute the tunnels based on the update.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
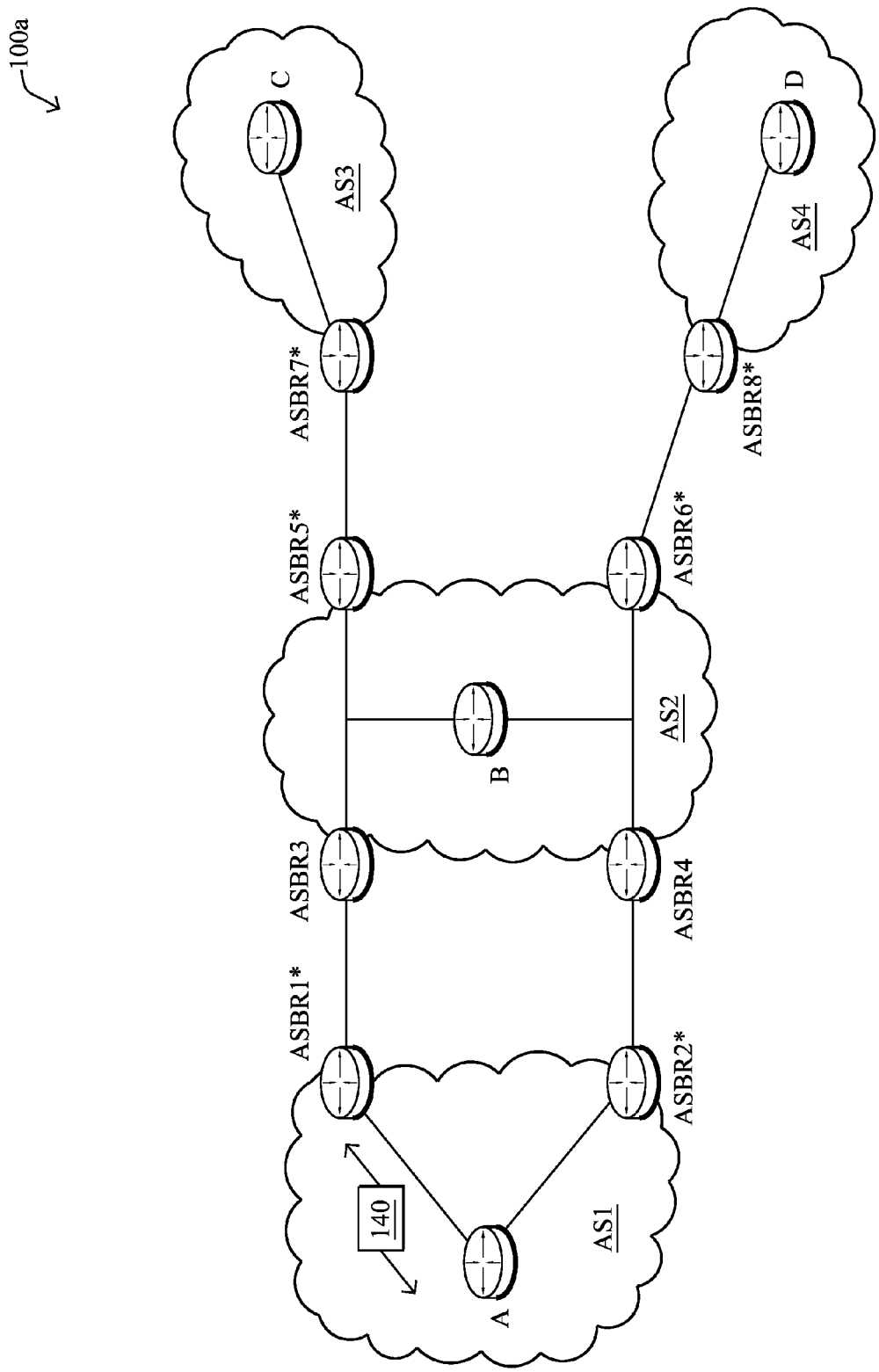
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
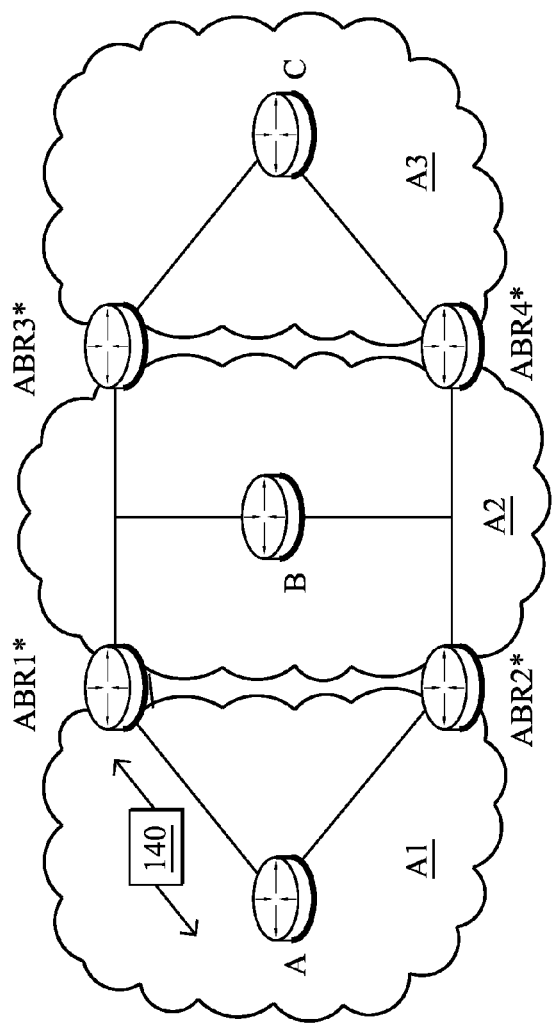

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
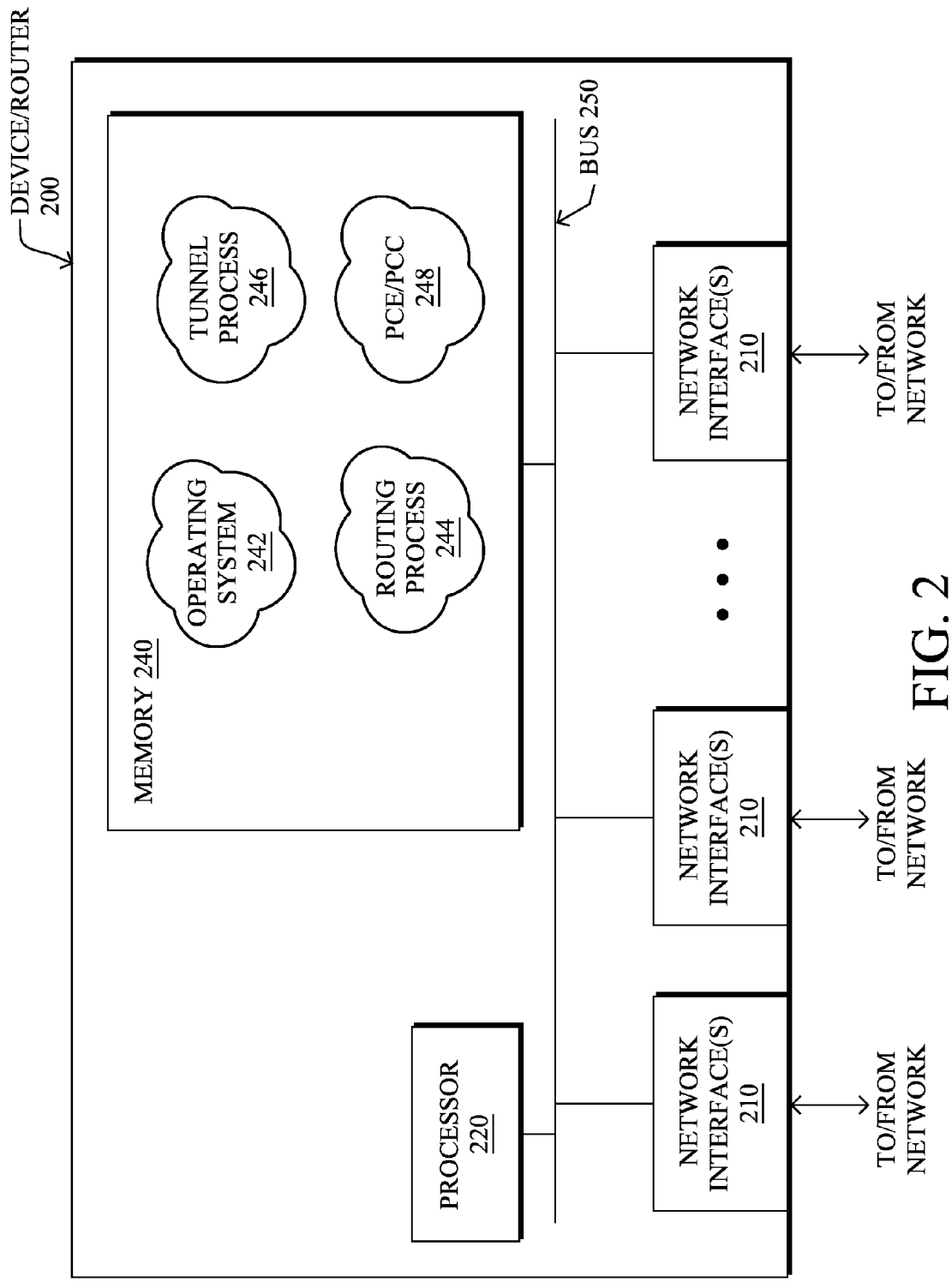
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very suboptimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
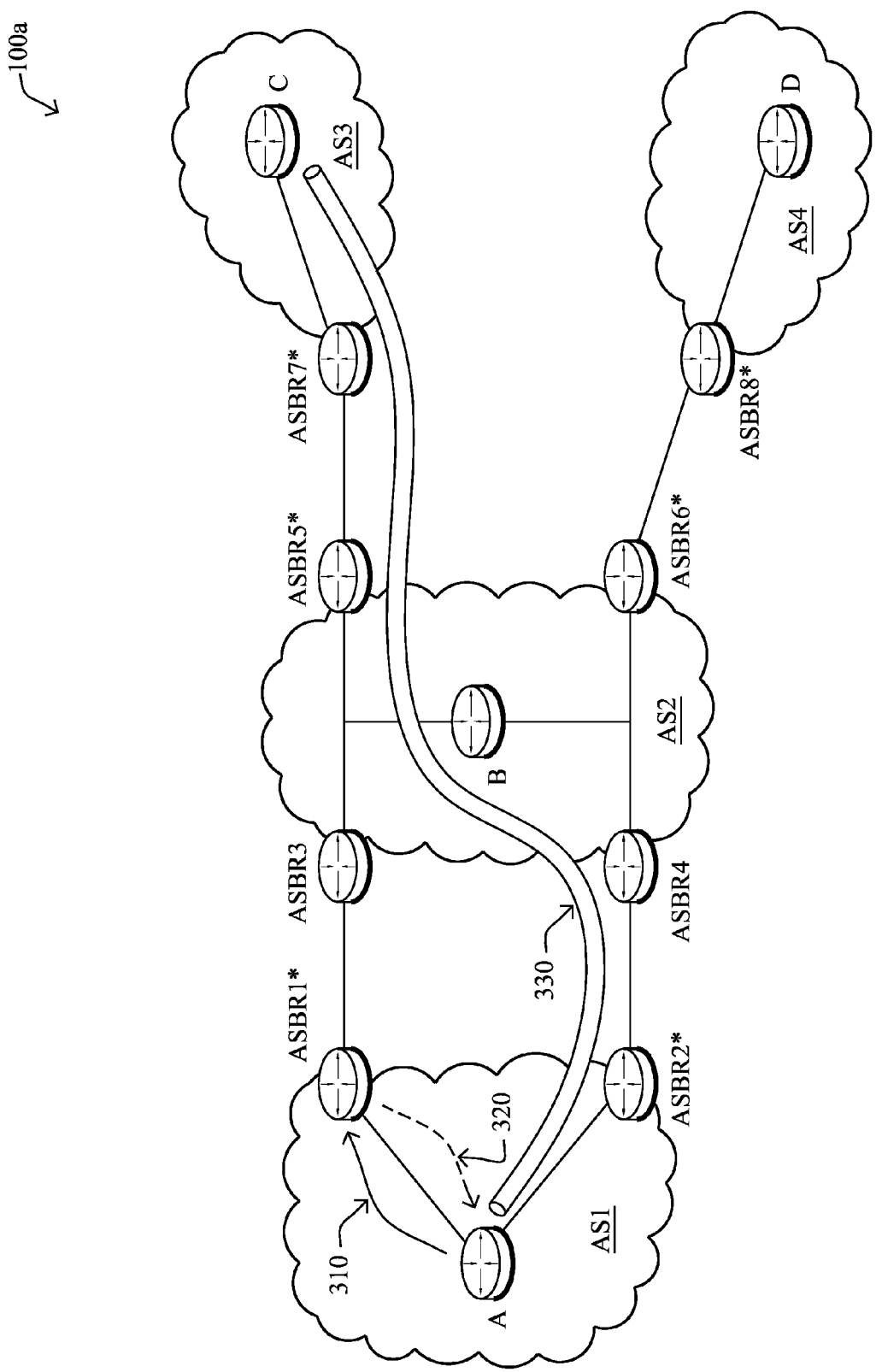
FIGS. 3A-3B illustrate examples of PCE-based tunnel computation in the networks of FIGS. 1A-1B.
Figure 3B:
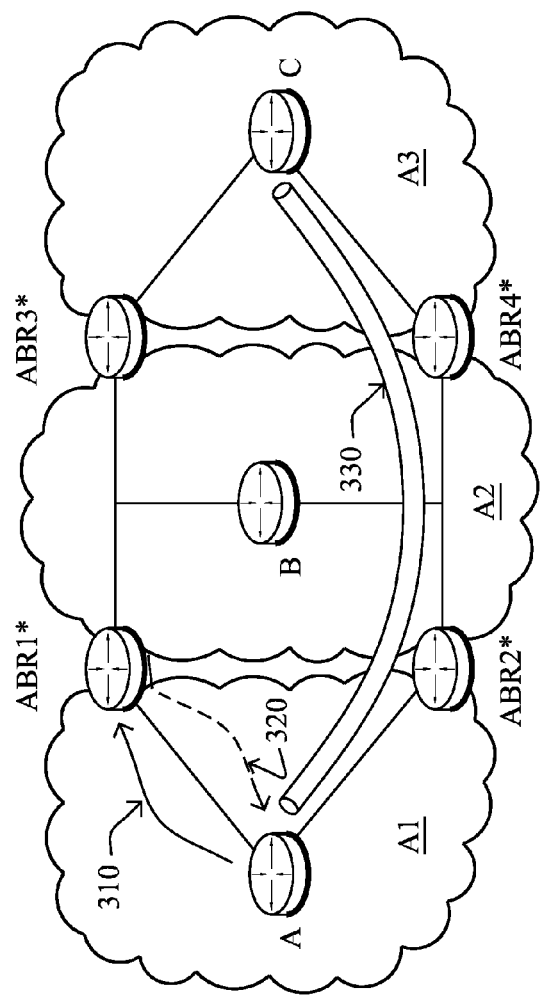

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

As mentioned, one of the major challenges of stateful PCE lies in the signaling churn and state maintenance in the network, which may be a limiting factor of such an architecture. In order to limit the amount of OSPF/ISIS LSA flooding so as to update the TED (Traffic Engineering Database), Traffic Engineering keeps track of reserved bandwidth on each link using fixed configurable and non-linear thresholds. For each link, the exact amount of reserved bandwidth is recorded and when a threshold is crossed, a new LSA is flooded updating the TED on all routers. These thresholds are generally non-linear, and closer to each other as the level of booking increases (for example, on a 10M link, the first threshold is 5M, 8M, 9M, 9.7, 9.8, 9.9). The idea of closer thresholds as we get closer to 100% of the bandwidth is that there is a need achieve a greater accuracy of the bandwidth booked since the risk of call set-up failure increases.

The use of thresholds for bandwidth booking states is a requirement to preserve the scalability of the routing protocol. On the other hand, when bandwidth booking is too coarse, this unavoidably leads to a high rate of call signaling failures. While this is generally not a major issue with distributed CSPF, this quickly leads to unsolvable problems with stateful PCEs. Indeed, when an LSP is computed by the stateful PCE, the path is provided to the PCC, that signals the LSP (while bandwidth is held temporarily on the PCE as it waits for reservation confirmations by the requestor, e.g., a PCUpd message). Call set-up failures in a stateful PCE environment imply that the PCC informs the stateful PCE of a call set-up failure, a local TED update is completed by the PCE releasing the previously booked bandwidth, followed by a second computation of the LSP after waiting for the TED update by the IGP or by other means. This shows that inaccuracy of the TED quickly becomes a limiting factor of stateful PCE architectures.

Ordered Flooding Requests

The techniques herein introduce a mechanism so as to trigger controlled routing updates (IGP and/or BGP) prior to major reshuffling of tunnels (e.g., TE LSPs) in the network. In particular, the techniques herein describe a mechanism that allow a stateful PCE, which determines the need to reroute a large number of tunnels in a potentially congested network, to retrieve an accurate view of the available set of resources in the network by triggering a controlled (ordered) refresh of a link-state advertisement (LSA) from a set of routers, for example, to retrieve their actual bandwidth booking without waiting for a routing (IGP/BGP) update.

Specifically, according to one or more embodiments of the disclosure as described in detail below, a stateful PCE in a computer network determines a need to route at least a threshold number of tunnels, and in response, triggers a routing update from a determined set of routers. Having updated the routing information and available network resources for the set of routers, the stateful PCE may then compute the tunnels based on the update.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly. Notably, in this instance, a non-PCE/PCC device, e.g., an LSR, may also be configured to operate according to an illustrative PCE/PCC process 248, e.g., to perform the actions in conjunction with a PCE as described herein.

Operationally, when a stateful PCE receives an LSP path computation request, and in order to better serve that request, it may have to re-compute the path of existing (and already established) LSPs so to better leverage and distribute the resources that are available in the network or sometimes simply make some room in the order to satisfy the new request. Stateful PCEs have the visibility not only on the TED reflecting the available resources in the network but also on the set of established LSPs throughout the network so as to be more accurate and efficient during path calculation (for both global re-optimization and also for increasing the probability of success to finding paths for tunnels).

Should the stateful PCE have to instruct other PCCs to reroute existing tunnels to satisfy a new request (a frequent occurrence), it is likely that the number of tunnels to be rerouted is considerably high, and therefore it is critical for the PCE to have an accurate view of the resource availability in the network so to efficiently and accurately compute the rerouted tunnel paths. Indeed, without an accurate view of the available resources in the network, this may lead to major changes in the network, rerouting a large number of tunnels, leading to a failure during the whole process because the TED inaccurately reflected the actual available resources in the network. This is a very undesirable situation that should be avoided in stateful PCE environments.

Resource availability visibility is generally performed through the flooding scheme in the IGP (OSPF/ISIS) where every router floods/refreshes its link-state advertisement (LSA) with the updated value of its links' resources. Flooding of resource information may also be generally driven by thresholds that can be dynamically adapted according to the level of resources. In may cases, it could happen that the flooded LSA (and therefore the TED) doesn't reflect the exact value of the available resources and hence cause tunnel setup failures due to discrepancies between what the PCE knows about network resources (from the TED) and the actual resource availability at setup time.

In order to prevent this inaccuracy the techniques herein specify a technique where the PCE, prior to re-routing existing tunnels, ensures that it acquires the updated visibility of the network resources (i.e., obtains an up-to-date version of each LSA in the TED). The trigger for such a mechanism could be due to a threshold number of tunnels to be routed and/or displaced (re-routed), the level of reservation in the network, etc. For example, if the network is far from being congested and/or the number of tunnels to be displaced is small, it may be advantageous not to trigger this mechanism. On the other hand, should the stateful PCE decide to reroute a large number of tunnels it may decide to trigger the routing update to avoid any risk of incorrect path computation because of TED inaccuracy.

According to the techniques herein, a mechanism is defined such that the PCE avoids major flooding storms in the network that could be caused if the PCE blindly requests a global network flooding/refresh of each router LSA. In particular, ordered flooding is defined where the PCE instructs one or more LSRs (routers) (called the set S of LSRs) to refresh their LSA. Note that by "refresh" the LSA, we mean that an LSR would refresh the LSA (update routing information) to populate the TED of all other routers, with the actual reserved bandwidth on per-preemption basis, without taking into account any form of thresholds, as in the current scheme, that is, based on an explicit request to do so from the PCE without awaiting a subsequent scheduled routing update (e.g., LSA).

The order of routers may be achieved through grouping routers taking into consideration various factors that may relate generally to localized collections of routers. wherein the localized collection is based on one of either network topology or physical location of the routers.

Figure 4A:
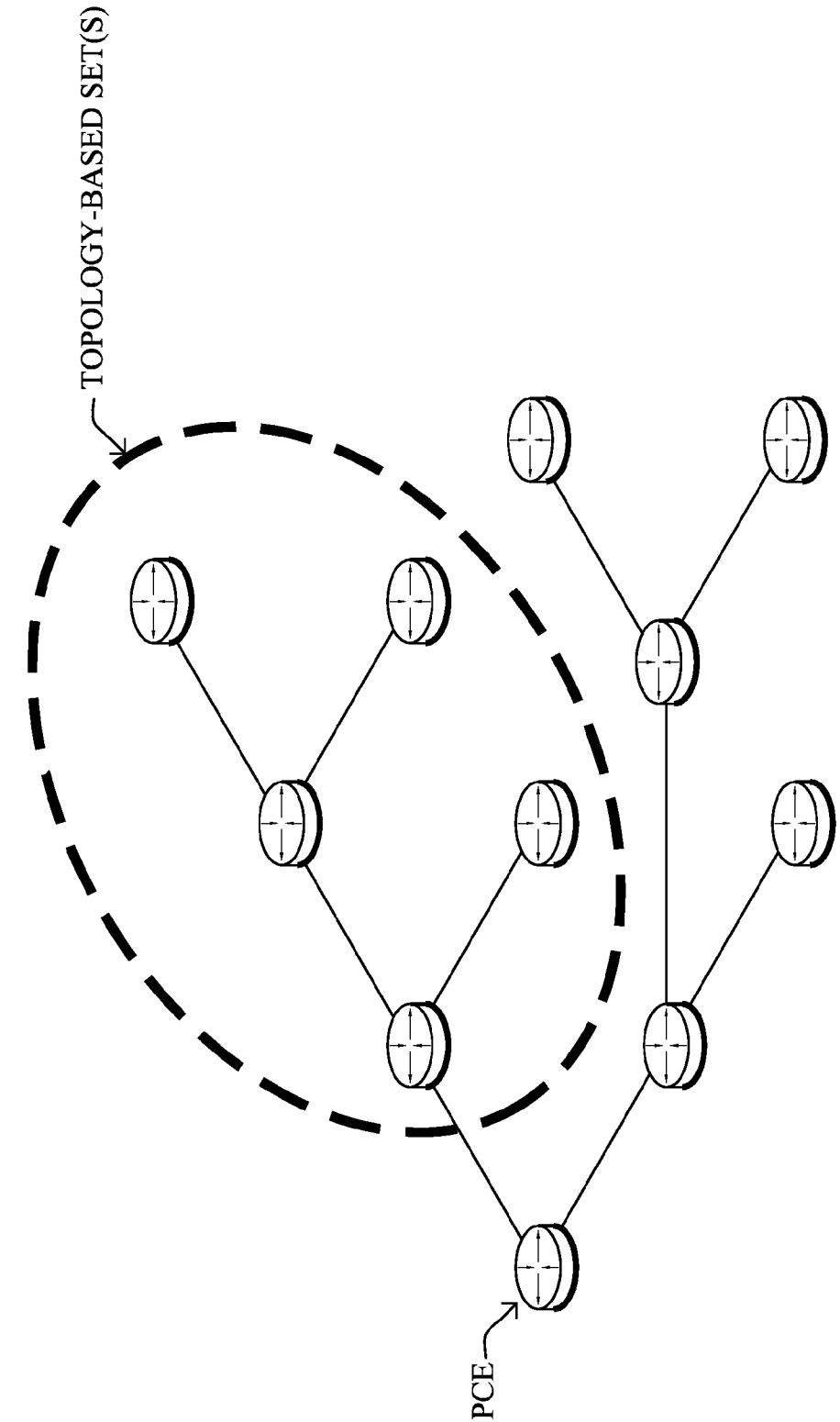
FIGS. 4A-4B illustrate examples of localized sets of routers.

First, such localization may be based on a topology graph, such as shown in FIG. 4A. In particular, the stateful PCE may request flooding from a set of routers S localized in a given area of the network. This can be implemented by running an SPF computation that would create groups of routers that are member of a common SPT (shortest path tree) branch. The size of such groups can be configured. This may be used to get a fresh resource availability for a specific area impacted by the reroute of tunnels, such as limiting the routing update to those routers within a general network vicinity of the rerouted tunnel(s).

Figure 4B:
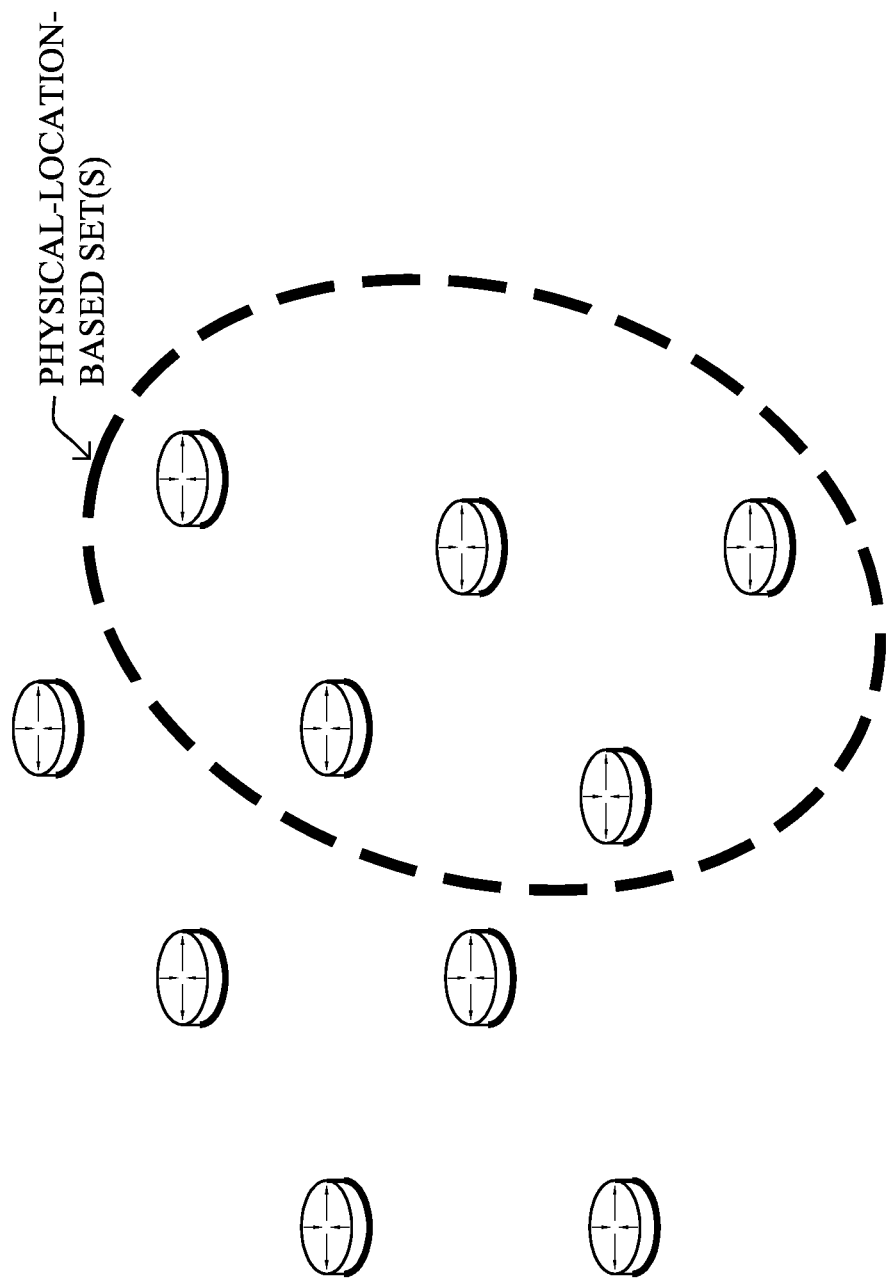

Second, such localization may be alternatively (or in addition) based on physical location, where the stateful PCE may request flooding to a set of routers co-located in the same region, as shown in FIG. 4B. Notably, though one option to determine physical location is by using global positioning technology, other systems (e.g., NPS, ALTO, etc.) may also be used so to locate addresses of the routers so groups would be based on physical location.

In another embodiment, arbitrary groups (including the entire network) may be established, where the stateful PCE may request flooding to any group of routers. In certain embodiments, this implies either a static configuration or a simple scheme where the PCE dynamically creates groups by walking the LSDB and groups routers according to some configured group sizing.

Once the sets/groups of routers are defined/computed, the PCE instructs all routers within a group to refresh their LSA. That is, the PCE triggers a routing update from the determined set of routers as needed in order to update routing information and available network resources for that set of routers, accordingly. If the sets have a limited size, the PCE may generate limited flooding activity in the network (per group), and by requesting flooding in a group-by-group fashion, the total amount of flooding is distributed over time without impacting the routing layer. In other words, the PCE schedules the routing updates from the set of routers in relation to other sets of routers, thus spacing them out over time. Alternatively each LSR may be asked to refresh its LSA according to a pre-defined schedule defined by the stateful PCE, e.g., scheduling routing updates from individual routers of the set(s).

Figure 5A:
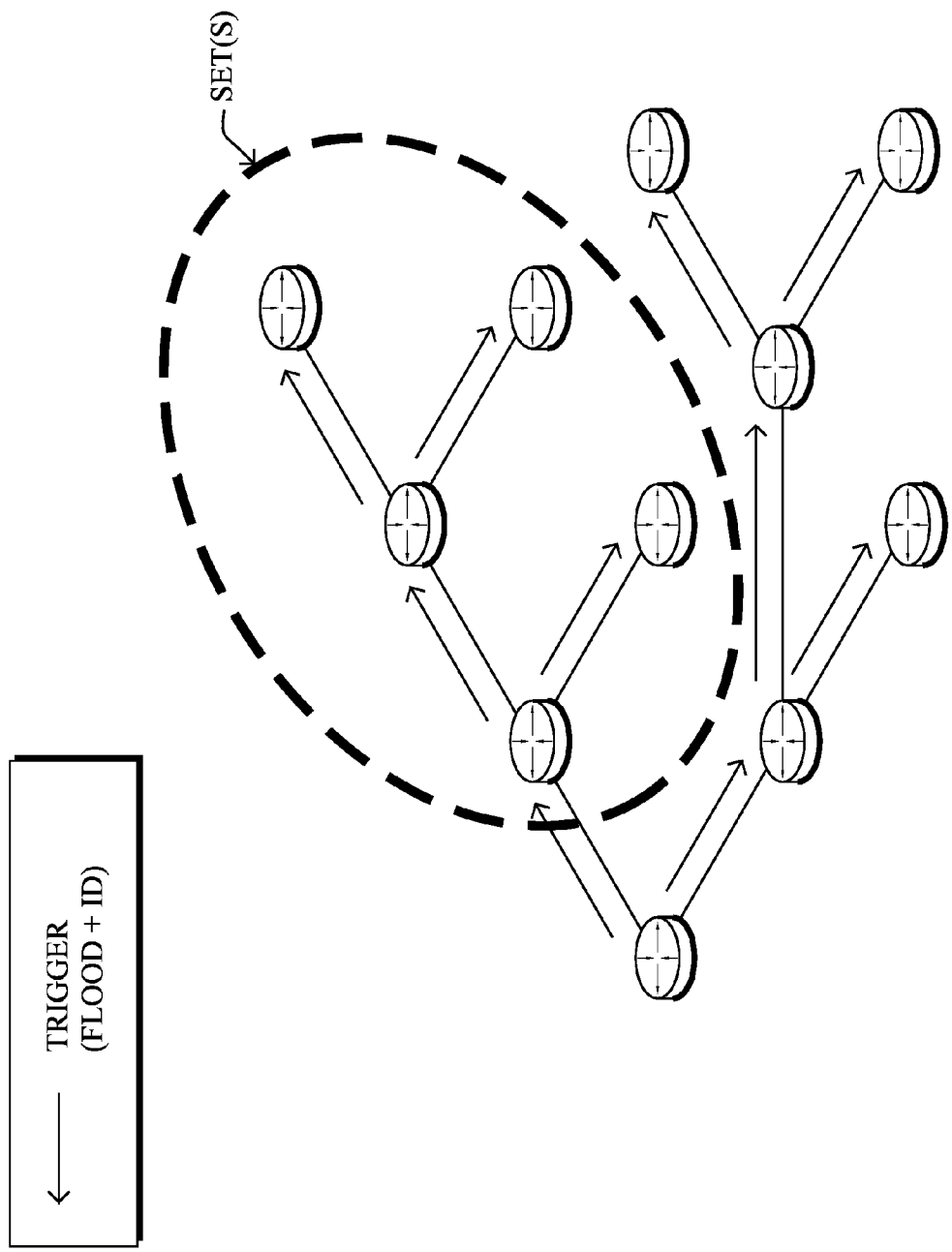
FIGS. 5A-5B illustrate examples of triggering routing updates.
Figure 5B:
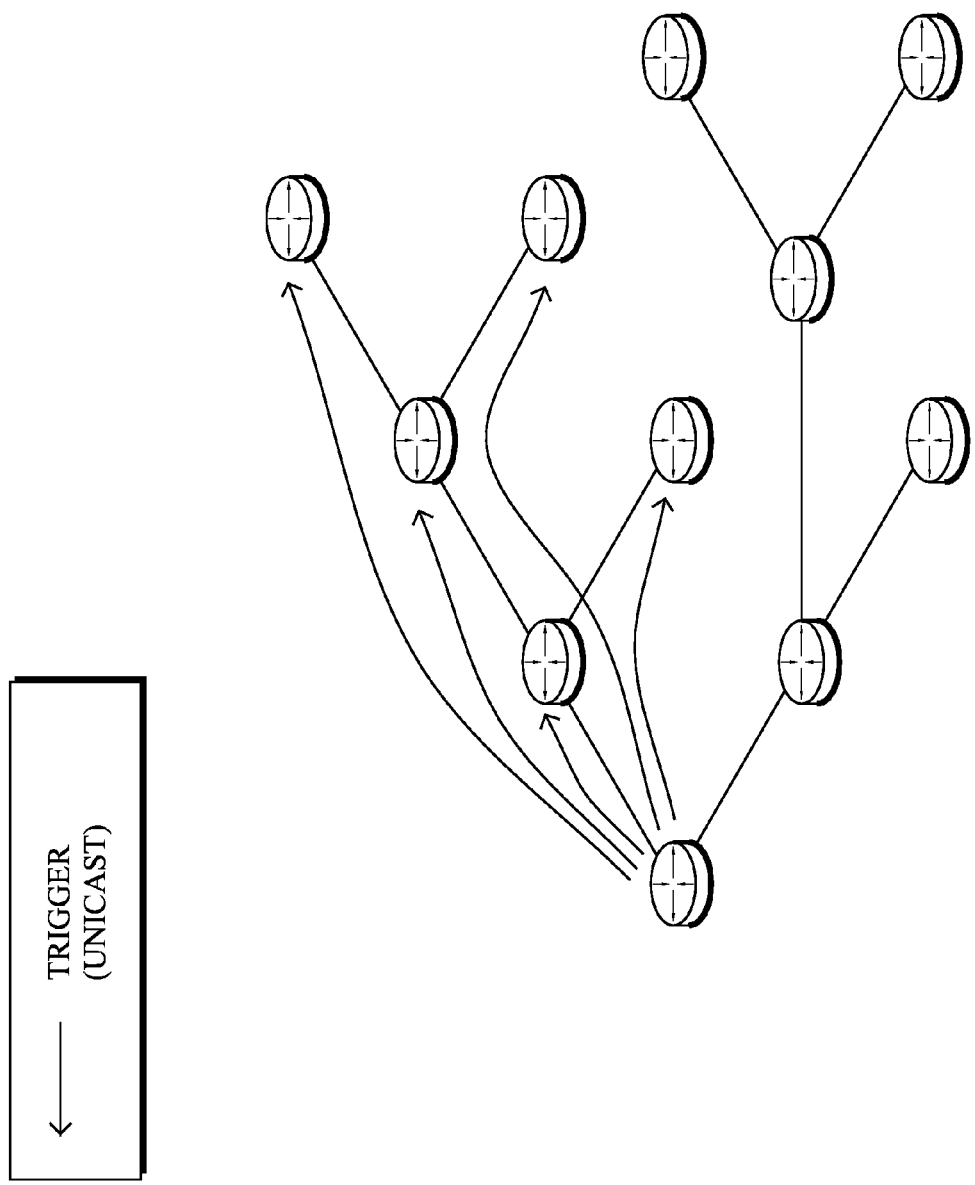

FIGS. 5A-5B illustrate options that may be used by the PCE to transmit the trigger (message) to the set of routers. As a first option (FIG. 5A), the PCE may request flooding by distributing a trigger into the computer network with an identification of the set of routers. For example, this may be accomplished through use a new "GenApp" Sub-TLV for IS-IS (e.g., as specified in the IETF Internet Draft entitled "Advertising Generic Information in IS-IS" <draft-ietf-isis-genapp> by Ginsberg, et al.). In this case the PCE originates a new GenApp subTLV that describes the instruction to refresh the LSA, as well as the identity (router-IDs) of the routers within the group. In addition, the message can potentially relay the time-schedule that is requested to refresh the LSA, as described above. As a second option, as shown in FIG. 5B, a trigger may be unicast to each router of the set of routers, such as through a PCEP extension to instruct each individual router of the group that it has to refresh its LSA. Notably, both of these options may be associated with the idea of using a separate IGP instance so as to separate the routing plane from the TE/MPLS/PCE plane. That is, flooding of TE information may be performed in a separate instance so not to interfere with the routing layer. In such case each router will establish two sets of adjacencies with its neighbors: one for the routing layer and one for the MPLS/TE/PCE layer. This has also the effect of relaxing the need of ordered (small) flooding groups.

Figure 6:
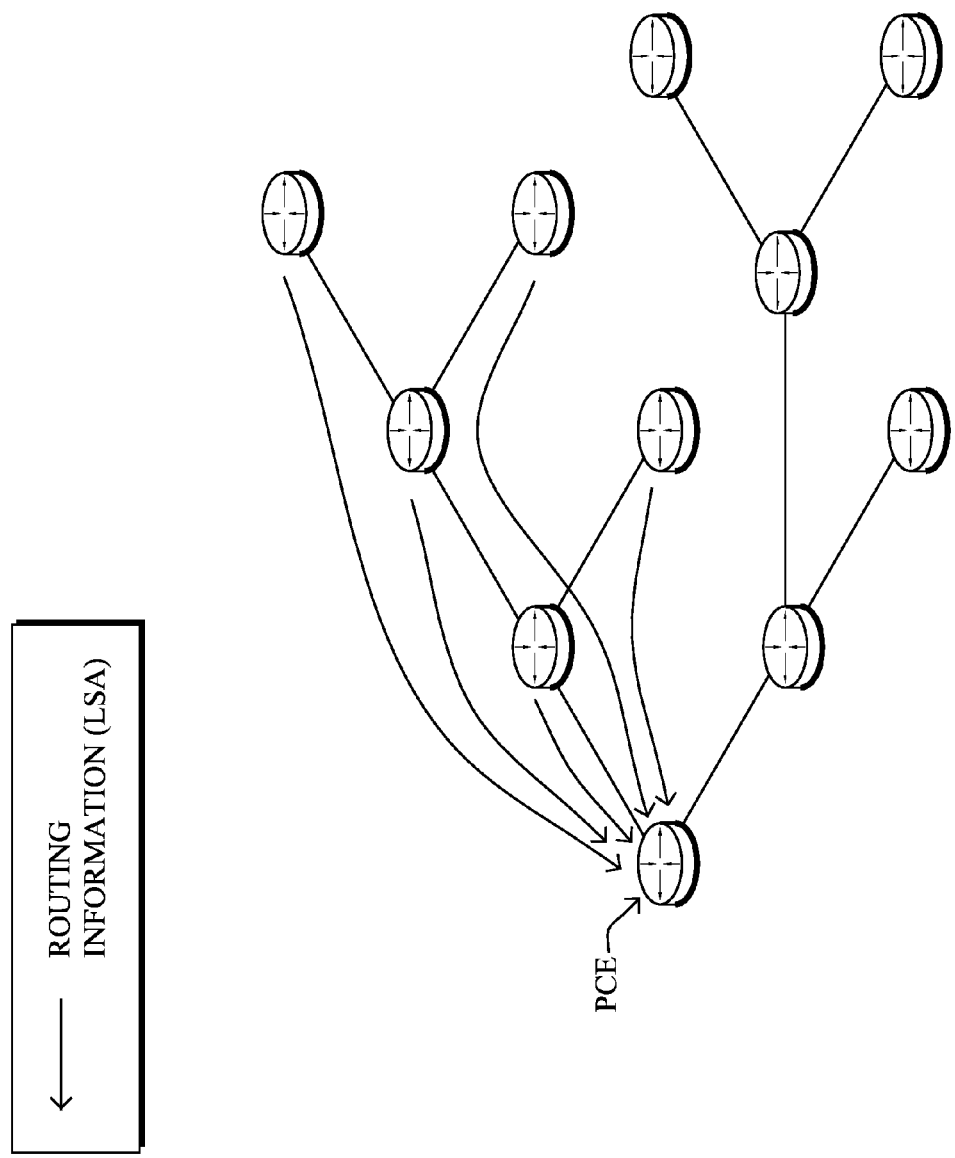
FIG. 6 illustrates an example of routing updates.

FIG. 6 illustrates the returned flood of routing updates (shown only from the perspective of the PCE, as floods may, in fact, traverse the entire network). Once all routers of the set(s) have finished their flooding, and the PCE has acquired a reliable and up-to-date visibility of the TED, then the PCE can start to compute all tunnel paths based on the update, thus reducing the risk of having setup failures during PCC path setup signaling.

Figure 7:
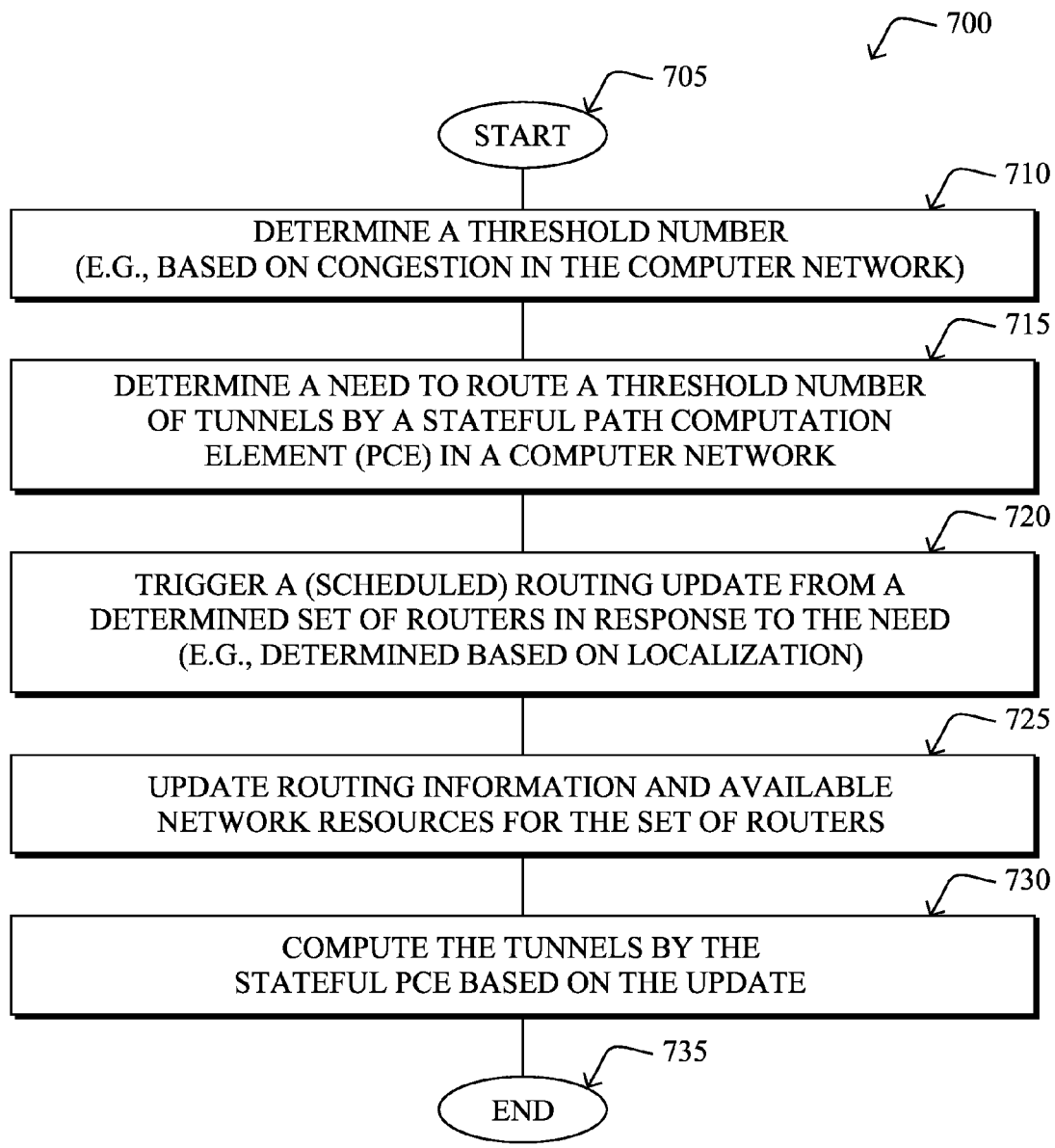
FIG. 7 illustrates an example simplified procedure for ordered flooding (advertisement) requests for PCE architectures.

FIG. 7 illustrates an example simplified procedure 700 for ordered flooding (advertisement) requests for PCE architectures in accordance with one or more embodiments described herein. The procedure 700 may start at step 705, and continues to step 710, where, as described in greater detail above, a stateful PCE may determine a threshold number, such as based on congestion in the computer network, and then in step 715 may determine a need to route a threshold number (i.e., at least the threshold number) of tunnels by a stateful path computation element (PCE) in a computer network. If so, then in step 720 the stateful PCE triggers a routing update from a determined set of routers. As mentioned, the routing update requests may be sent to a set of routers based on localization (e.g., topology or physical location), and may be configured to provide a degree of scheduling, whether between various sets or within a particular set itself. As the advertisements are received, the stateful PCE may then update its routing information and available network resources for the set of routers in step 725 in order to compute the tunnel(s) in step 730. The procedure 700 may then illustratively end in step 735, with the option to re-determine thresholds, determine needs to compute additional tunnels, etc.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for ordered flooding (advertisement) requests for PCE architectures. In particular, the techniques herein give stateful PCEs the ability to achieve an accurate view of the resources available in the network (without causing storms of LSA refreshes) and thus avoiding improper tunnel reroutes and traffic churn in the network when re-optimizing the placement of tunnels.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a stateful path computation element (PCE) in a computer network, a level of congestion, wherein the stateful PCE keeps track of label switched states in the computer network;
   in response to determining the level of congestion, calculating, by the stateful PCE, a threshold number of tunnels to be re-routed based on the determined level of congestion;

in response to calculating the threshold number of tunnels, determining, by the stateful PCE, a need to reroute at least the calculated threshold number of tunnels;

in response to determining the need to reroute at least the calculated threshold number of tunnels, triggering, by the stateful PCE, prior to re-routing the calculated threshold number of tunnels, a new ordered routing update from a determined set of routers to retrieve an accurate view of an available set of resources in the computer network, wherein new ordered routing update is triggered prior to re-routing of already established tunnels based at least on a number of tunnels to be re-routed being above the calculated threshold number of tunnels;

in response to triggering the new ordered routing update, updating, by the stateful PCE, routing information and the available network resources for the set of routers; and in response to updating the routing information and the available network resources for the set of routers, computing and re-routing the tunnels by the stateful PCE based on the update.

2. The method as in claim 1, wherein triggering comprises an explicit request to the set of routers refresh the routing information at the stateful PCE without awaiting a subsequent scheduled routing update.

3. The method as in claim 1, further comprising:
determining the set of routers based on a localized collection of routers in the computer network.

4. The method as in claim 3, wherein the localized collection is based on one of either network topology or physical location of the routers.

5. The method as in claim 1, further comprising:
scheduling routing updates from the set of routers in relation to other sets of routers.

6. The method as in claim 1, further comprising:
scheduling routing updates from individual routers of the set of routers.

7. The method as in claim 1, wherein triggering comprises:
unicasting a trigger to each router of the set of routers.

8. The method as in claim 1, wherein triggering comprises:
distributing a trigger into the computer network with an identification of the set of routers.

9. An apparatus, comprising:
one or more network interfaces to communicate with a computer network;
a processor coupled to the network interfaces and adapted to execute one or more processes; and
a memory configured to store a stateful path computation element (PCE) process executable by the processor that keeps track of label switched states in the computer network, the process when executed operable to:
determine a level of congestion in the computer network, wherein the stateful PCE keep track of label switched states in the computer network;
in response to a determination of the level of congestion, calculate a threshold number of tunnels to be re-routed based on the determined level of congestion;
in response to a calculation of the threshold number of tunnels, determine a need to re-route at least the calculated threshold number of tunnels;
in response to a determination of the need to reroute at least one of the calculated threshold number of tunnels, trigger, prior to re-routing the calculated threshold number of tunnels, a new ordered routing update from a determined set of routers to retrieve an accurate view of an available set of resources in the computer network, wherein new ordered routing update is triggered prior to re-routing of already established tunnels based at least on a number of tunnels to be re-routed being above the calculated threshold number of tunnels;

in response to triggering the new ordered routing update, update routing information and available network resources for the set of routers; and in response to updating the routing information and the available network resources for the set of routers, compute and reroute the tunnels based on the update.

10. The apparatus as in claim 9, wherein the process when executed to trigger is further operable to:
transmit an explicit request to the set of routers refresh the routing information without awaiting a subsequent scheduled routing update.

11. The apparatus as in claim 9, wherein the process when executed is further operable to:
determine the set of routers based on a localized collection of routers in the computer network.

12. The apparatus as in claim 9, wherein the localized collection is based on one of either network topology or physical location of the routers.

13. The apparatus as in claim 9, wherein the process when executed is further operable to:
schedule routing updates from the set of routers in relation to other sets of routers.

14. The apparatus as in claim 9, wherein the process when executed is further operable to:
schedule routing updates from individual routers of the set of routers.

15. The apparatus as in claim 9, wherein the process when executed to trigger is further operable to:
unicast a trigger to each router of the set of routers.

16. The apparatus as in claim 9, wherein the process when executed to trigger is further operable to:
distribute a trigger into the computer network with an identification of the set of routers.

17. A tangible, non-transitory, computer-readable media having software encoded thereon, the software, when executed by a processor on a stateful path computation element (PCE) that keeps track of label switched states in the computer network, operable to:
determine a level of congestion in the computer network, wherein the stateful PCE keep track of label switched states in the computer network;
in response to a determination of the level of congestion, calculate a threshold number of tunnels to be re-routed based on the determined level of congestion;
in response to a calculation of the threshold number of tunnels, determine a need to re-route at least the calculated threshold number of tunnels;
in response to a determination of the need to reroute at least one of the calculated threshold number of tunnels, trigger, prior to re-routing the calculated threshold number of tunnels, a new ordered routing update from a determined set of routers to retrieve an accurate view of an available set of resources in the computer network, wherein new ordered routing update is triggered prior to re-routing of already established tunnels based at least on a number of tunnels to be re-routed being above the calculated threshold number of tunnels;
in response to triggering the new ordered routing update, update routing information and available network resources for the set of routers; and in response to updating the routing information and the available network resources for the set of routers, compute and reroute the tunnels based on the update.

18. The tangible, non-transitory, computer-readable media as in claim 17, wherein the software when executed is further operable to:
schedule routing updates from the set of routers.

* * * * *